Feb. 16, 1971 W. C. RUDD 3,563,713
EXPLOSIVE WELDING
Filed Feb. 29, 1968 2 Sheets-Sheet 1

INVENTOR.
WALLACE C. RUDD
BY
*Eli Weis*
ATTORNEY

Feb. 16, 1971 W. C. RUDD 3,563,713
EXPLOSIVE WELDING

Filed Feb. 29, 1968 2 Sheets-Sheet 2

INVENTOR.
WALLACE C. RUDD
BY
Eli Weiss
ATTORNEY

United States Patent Office 3,563,713
Patented Feb. 16, 1971

3,563,713
EXPLOSIVE WELDING
Wallace C. Rudd, Larchmont, N.Y., assignor to AMF Incorporated, New York, N.Y., a corporation of New Jersey
Filed Feb. 29, 1968, Ser. No. 709,464
Int. Cl. B23k 1/20, 31/02
U.S. Cl. 29—488
15 Claims

ABSTRACT OF THE DISCLOSURE

In this disclosure, workpieces which are to be joined by explosive welding are first heated to a desired temperature and then subjected to an explosive force to make the weld. Additionally, when cladding, with an explosive force, a flux is used to maintain the interface spacing.

---

This invention relates generally to metal working and more particularly to methods and apparatus for explosively welding together two or more metal parts.

Explosive welding or bonding of metals has several advantages in addition to having desirable capabilities. With explosive bonding it is possible to obtain high-strength metallurgical bonding between similar metals; and, between dissimilar and normally incompatible metals. Additionally, it can be applied commercially to join large areas as when cladding; and, it shows promise for short run industrial operations which may not justify the purchase of expensive equipment.

There are, however, certain major problems inherent in explosive welding or bonding of parts such as safe handling, noise and blast effects. For example, many explosive compounds are very sensitive and require extreme care in handling. Additionally, the noise and blast effects can be dangerous and could be objectionable if the facility is located in a populated area. As such, explosive welding or bonding is not usually thought of as one of metal workings safest processes.

During the setting up of parts which are to be explosively bonded, it is not uncommon to provide a space between the two workpieces which are to be joined. This space is usually referred to as the interface clearance gap.

In some applications, the workpieces are positioned parallel to each other to provide a constant interface clearance gap; and, in other applications the workpieces are positioned at an angle to each other to provide an angular interface clearance gap.

In each instance, however, shims or dimples on one of the members provides the desired interface clearance gap.

Many attempts have been made to reduce the undesirable effects of explosive bonding. The explosive bonding procedure has been performed under water, beneath sand; and within a chamber having a partial vacuum.

The purpose of these procedures is to reduce or eliminate noise and air blast. When explosive bonding is performed under water, the interface is usually in an air or vacuum environment.

It is an object of this invention to provide a method of explosively bonding workpieces together with a reduced force.

It is also an object of this invention to provide a method of explosively bonding workpieces together with a reduced explosive charge.

It is another object of this invention to provide a method of explosively bonding workpieces together with reduced noise and blast effects.

It is still another object of this invention to provide a method of explosive bonding which is economical to use and reliable in operation.

Other objects and many of the attendant advantages of this invention will be readily appreciated as the same becomes better understood by reference to the following detailed description when considered in connection with the accompanying drawings wherein.

Figure 3:
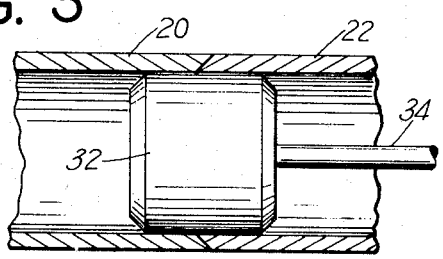
Figure 4:
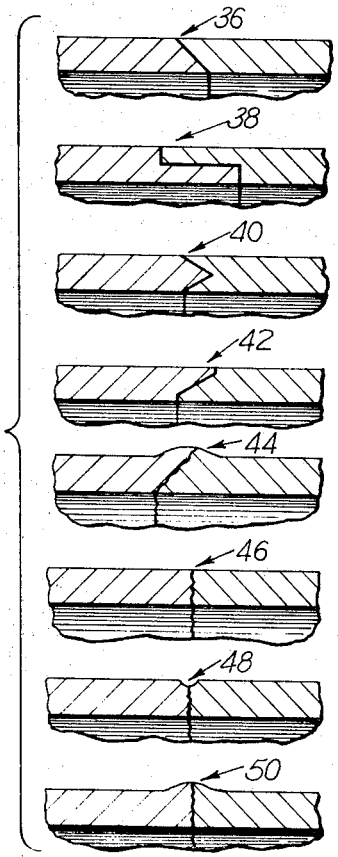
Figure 5:
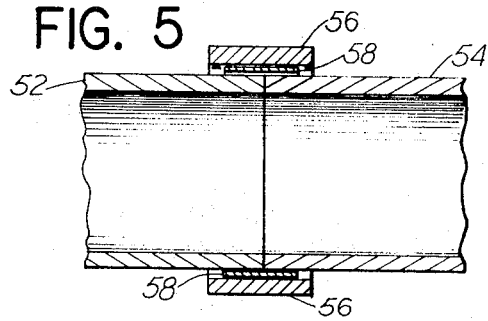
Figure 6:
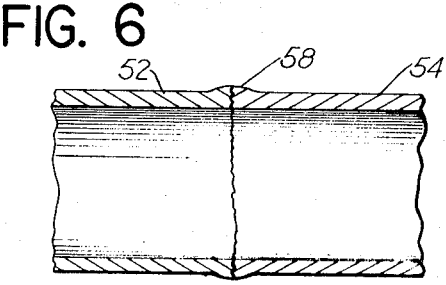
Figure 11:
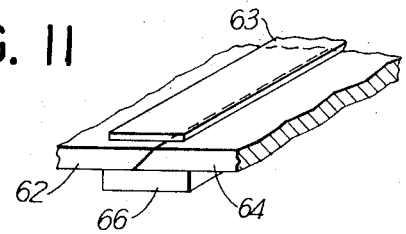
Figure 12:
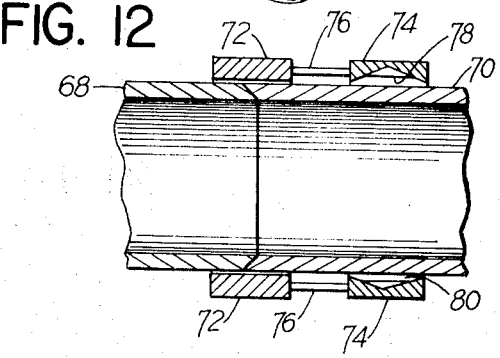
Figure 13:
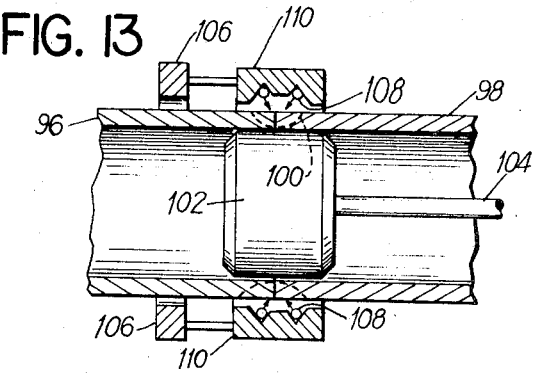
Figure 14:
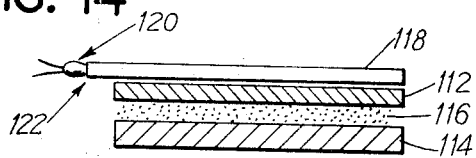
Figure 15:
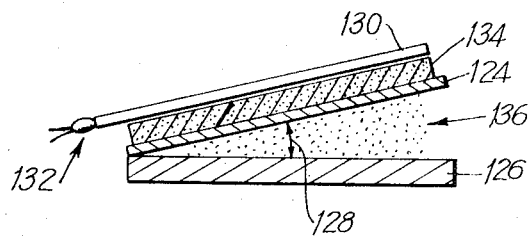
Figure 16:
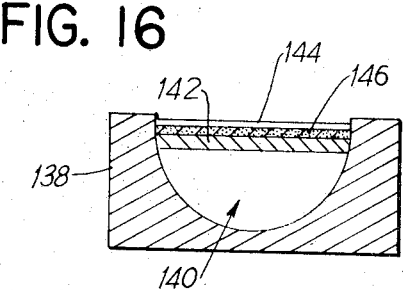

FIG. 3 illustartes the use of an internal support means within pipe like members when practicing the principles of this invention;

FIG. 4 illustrates some of the joint configurations of the workpieces when practicing the principles of this invention;

FIGS. 5 and 6 illustrate the use of a filler in accordance with the principles of this invention;

FIGS. 7, 8, 9 and 10 illustrates still another embodiment of the use of a filler in accordance with the principles of this invention;

FIG. 11 illustrates the bonding of workpieces of finite lengths in accordance with the principles of this invention;

FIGS. 12 and 13 illustrate the use of explosive charges having shaped back-up means in accordance with the principles of this invention;

FIGS. 14 and 15 illustrate constant and angled interfaces when bonding clad in accordance with the principles of this invention; and FIG. 16 illustrates explosive forming according to the principles of this invention.

Similar reference characters refer to similar parts throughout the several views.

Currently, explosive bonding of metal workpieces is performed at or near room temperature. As such, the pressures required to make a weld are relatively high and, as such, the explosive required to form the weld creates violent noise and blast effects.

Metals, when heated, can be welded together with pressures which are less than 3,000 p.s.i.

In this invention, the two workpieces which are to be joined by explosive bonding are first heated to a desired temperature by some convenient means; and then subjected to an explosive bonding force which makes the weld.

As the pressure required to weld the hot workpieces together is very much less than the pressures which would be required if the workpieces were cold, a substantially smaller explosive charge is required to produce the weld. This use of a smaller explosive charge results in the creation of a reduced force; reduced noise and blast effects, economy of operation; and increase in safety which results from handling and using smaller yield explosive charges.

Figure 1:
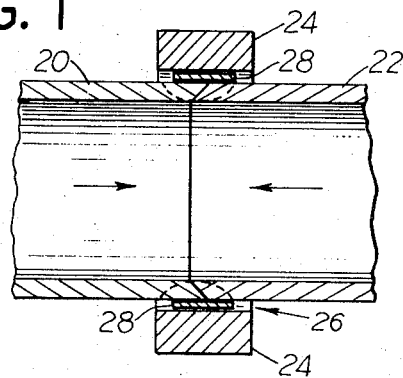
FIG. 1 is a view of structure in accordance with the principles of this invention for the explosive bonding of two cylindrical workpieces.

Referring to FIG. 1, there is illustrated structure in accordance with the principles of this invention. Two pipes 20, 22 which are to be explosively bonded to each other to form a butt type of weld are coupled to a clamp, drive and hold means which engages each of the pipes 20, 22 and drives them towards each other. The ends of the pipes can be beveled in opposite directions to compliment each other. Upon making contact, the movement of the pipes toward each other stops, and the pipes are locked in position to prevent one pipe from separating or moving back away from the other pipe. The clamps which grasp the pipes can be designed to grip the pipe on its outside surface or inside surface, whichever is most convenient.

A heating means which may be a single gas flame, a plurality of gas flames arranged in the shape of a ring, the flames being directed inward towards the center, an induction coil normally of the split type or the like can be used to heat the ends of the pipe. In FIG. 1, the heating means 24, is illustrated as an induction coil normally of a split type mounted around the ends of the pipes, some radial clearance 26 normally referred to as coupling being present between the outside surface of the pipes and the inside surface of the induction coil. The coil 24 is fed with high frequency current which can be from 3000 cycles per second to 10,000 cycles per second or thereabout to heat by induction the entire joint area to near welding temperature. Where ferrous pipes are being welded, this temperature can be approximately 1400° to 2500° F. It is here noted that as the temperature of the joint area increases, the force required to produce the weld decreases. Thus, if the joint area were brought to a temperature of 500° F., a larger explosive force would be required to produce the weld. However, this force would still be less than that required if the joint area had not been heated.

A strip of explosive plastic or primer cord means 28 is positioned between the coil 24 and the pipes and is protected from the heat of the pipes by any convenient means.

The coil 24 and the explosive means 28 surround completely the contacting ends of the pipes.

When the joint or ends of the pipes reach the desired temperature, the explosive strip is ignited and pressure is generated inwardly around the periphery of the joint to form a solid weld bond by explosive bonding.

The explosive strip can be of the low, medium or high velocity explosives. In the low and medium class, the explosives include ammonium nitrate, ammonium perchlorate, nitroguanidine and dynamites. They are usually less expensive than the explosives of the high velocity class. Their detonation velocities range from 5,000 to 15,000 feet per second. Some of the explosives take the form of flexible plastic sheet, cord, pressed shapes and cast shapes. Others are used in powder or granulated form. In the high velocity class, detonation velocities range from 15,000 to 25,000 feet per second; and typical explosives include TNT, Du Pont's Detasheet and Primacord.

In the structure illustrated in FIG. 1, there may exist the possibility that the force of the explosion could result in damage to the heating means. A structure which can be used to avoid damage to the heating means is illustrated in FIG. 2.

Figure 2:
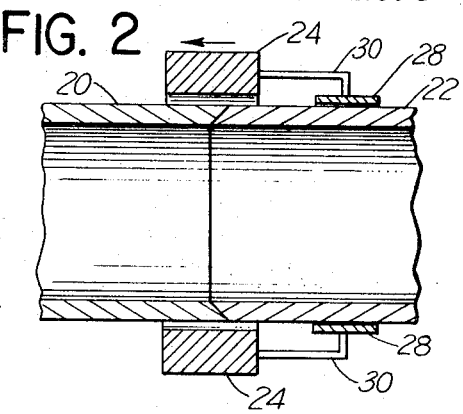
FIG. 2 is another embodiment of structure in accordance with the principles of this invention illustrating displacement of the heating means during the occurrence of the explosion.

Referring to FIG. 2, the coil is displaced from and coupled to the explosive means 28 by means of a support means 30 such as a bracket or the like. In operation, the coil 24 is supplied with high frequency current to heat the contacting ends of the pipes 20, 22 to the desired temperature which, in this instance, may be slightly above the working temperature. When the desired temperature is reached, the coil 24, explosive means 28 and support means 30 are driven by a drive means to position the explosive means 28 over the heated contacting ends of the pipes 20, 22. The explosive means 28 is rigidly coupled to the coil 24 through the support means 30 and, therefore, as the explosive means 28 is moved towards the heated contacting ends of the pipes 20, 22 the coil 24 is moved away from the heated ends. After the explosive means 28 is positioned over the heated ends of the pipes, it is activated, an explosion occurs, and the weld is made. The coil, having been moved away from the immediate vicinity of the weld is not subjected to the blast effect of the explosion, therefore, is not subjected to possible damage.

During the interval of time during which the coil is moved away from the ends of the pipes and the explosive means is being positioned over the ends of the pipes, the contacting ends of the pipes may begin to cool. Therefore, if desired, provision should be made to compensate for this cooling of the ends of the pipes by initially heating the ends of the pipes to the temperature desired for the welding plus the temperature drop that occurs during the time required to position the explosive means over the heated ends of the pipes.

In some circumstances, it may be desirable to heat the contacting ends of the pipes 20, 22 with means other than an induction coil. For example, it may be desired to use one of the many types of gases available for heating. In this instance, the coil 24 would be replaced by a gas burning assemblage such as a split ring designed to direct the burning gas around the circumference of the pipe to heat the contacting ends of the pipes 20, 22 to the desired temperature. The gas burning assemblage can be coupled to the source of gas by means of a flexible hose to permit the assemblage to be moved relative to the heated ends of the pipes 20, 22 as illustrated and described in FIG. 2.

When welding pipes composed of ferrous material together in an end to end arrangement, an anvil may be required to prevent wall collapse or to insure that the base diameter of the pipe is constant. In these instances, as illustrated in FIG. 3 a cylinder 32 having a diameter slightly smaller than the minimum inside diameter of the pipes 20, 22 is positioned within the pipes and at the contacting ends to function as an anvil by providing support to the pipes at the instant the weld is made. A handle 34 coupled to the cylinder 32 permits the cylinder 32 to be inserted into the pipes, positioned along the pipes, and removed from the pipes.

It is to be remembered however, that as an explosive charge of reduced yield is used in this invention, the strength of the pipe wall may be sufficient to permit the making of a weld without the need of a back-up means such as an anvil or the like.

FIG. 4 illustrates some of the joint configurations which can be used with this invention. The joint 36 is commonly referred to as a scarfed type. The joint 38 is commonly referred to as being an offset lap. The joint 40 is commonly referred to as a double scarf. The joint 42 illustrated is commonly referred to as a modification of the scarf. The joint 44 illustrated is a scarf in which the ends of the workpieces such as a pipe have been previously upset. The joint 46 illustrated is that of a pure butt. In the pure butt joint 46, a dent 48 is usually formed in the upper surface when the weld is formed. The joint 50 illustrated is similar to the joint 46 except that the edges of the workpieces have been upset before making the weld.

Referring to FIGS. 5 and 6, there is illustrated the use of foil with the principles of this invention to fill the dent created in a pure butt weld as illustrated in FIG. 4. A strip of filler-foil metal 58 is positioned around the contacting ends of two pipes 52, 54 aligned end to end to be butt welded together, the foil 58 and the contacting ends of the pipes 52, 54 being heated to a desired temperature by an induction coil, a gas flame or the like. After the contacting end of the pipes and the foil have reached the temperature desired, the explosive means 56 is positioned around the foil and the contacting joints of the pipes 52, 54. Detonation of the explosive means 56 welds the hot ends of the pipes together and, at the same time, forces the previously heated foil into the surface of the pipes to produce a butt weld having no dent, the result obtained being illustrated in FIG. 6.

Continuing further, with the principles of using metal foil to fill the dent created in a butt weld, and referring now to FIGS. 7, 8, 9 and 10 there is illustrated the welding of the ends of pipes or plates together using the principles of this invention.

Figure 7:
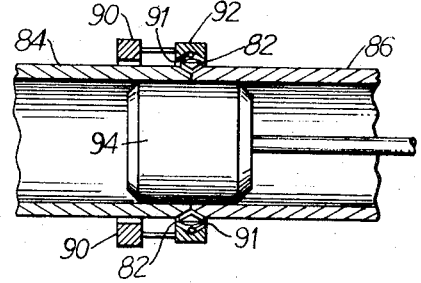
Figure 8:
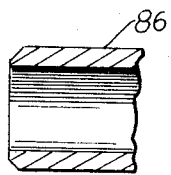
Figure 10:
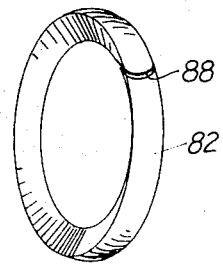

Normally, the ends of pipes are bevelled as illustrated in FIG. 8; and normally, when pipes are joined together they are arc welded. If it is desired, however, to use the same configuration on the ends of the pipe for hot explosive bonding as is used for arc welding, then a triangular shaped filler piece 82 as illustrated in FIG. 7 should be used. In operation, the pipes 84, 86 are butted together in alignment with each other and locked into position by a holding means. The filler means 82 is positioned within the space formed by the beveled ends of the pipes. Referring to FIG. 10 for the pipe the filler piece can be in the form of a split ring having tapered or scarfed ends 88. The tapered overlapping end on the ring 82 permits it to adjust automatically and be used on pipes having the normal acceptable variations or tolerance in diameter size.

Figure 9:
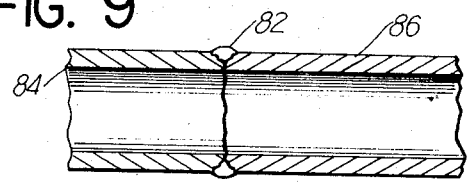

A heating means 90 such as an induction coil, a gas flame or the like is positioned to heat the contacting ends of the pipes 84, 86 and the filler 82 to a desired temperature. Thereafter, an explosive means 91 which can be provided with a back up means 92 is detonated. The force of the explosion forces the filler 82 down into the bevelled ends of the pipes and a weld is formed from the end of the pipe 84 to the filler piece 82 and from the end of the pipe 86 to the filler piece 82 to produce a welded joint having an appearance similar to that as illustrated in FIG. 9. A support means or anvil 94 having a diameter slightly smaller than the inside diameter of the pipes 84, 86 can be positioned across the abutting ends of the pipes to prevent collapse of the ends of the pipes when the explosive charge is detonated.

As noted previously, when making a butt type of weld joint, a notch or depression can result. In this embodiment, the filler piece can be shaped and sized to provide the extra metal required to fill the normally crested notch or depression.

Referring to FIG. 11 there is illustrated the welding of workpieces of finite lengths in accordance with the principles of this invention. In the figures, the workpieces 62, 64 are positioned in butt relationship with each other and held in such position by a clamp means. The contacting ends of the workpieces are then heated to a desired temperature by an induction coil, a gas flame or the like. After the contacting ends of the workpieces come to the desired temperature, the source of heat is removed and the explosive charge 63 which is positioned adjacent to the contacting ends of the workpieces is detonated to form the weld. If required to provide support during the detonation of the explosive charge, an anvil means 66 can be positioned opposite the explosive charge on the other side of the workpieces. If it is desired to use the principles of this invention to fabricate large pressure vessels, workpieces 62 and 64 of FIG. 11 will be representative of the two ends of a single sheet of metal bent around to form a cylinder. Upon the forming of the cylinder, the ends need only to be attached to complete the vessel.

In certain instances it may be desirable to utilize a shaped explosive charge or backup when practicing the principles of this invention. Referring to FIG. 12, there is illustrated workpieces 68, 70 positioned in butt relationship with each other and maintained in such relationship by means of clamping structure. The contacting ends of the workpieces 68, 70 are heated to a desired temperature by a heating means 72 such as an induction coil, a gas flame or the like. Thereafter, the heating means 72 is driven by any convenient drive means away from the contacting ends of the workpieces 68, 70; and a back-up member 74 which can be coupled rigidly to the heating means by means of a member 76 which is positioned over the contacting ends of the workpieces 68, 70. If the workpieces 68, 70 are ends of pipes, then both the heating means and the back-up member will be ring shaped to encompass the pipe. The explosive means 78 is positioned within a shaped chamber 80 in the back-up member 74 to form a shaped blast effect on detonation of the explosive means 78.

In some applications, it is desirable to reduce oxidation of the workpieces being welded. In such instances, the joint can be coated with a flux such as borax or the like or enclosed in a gas atmosphere to reduce oxidation while the workpieces are being heated.

It is to be understood that, in joining pipes together, the explosive charge can be positioned within the pipe; and, if required, the anvil or backup means can be positioned around the outside of the pipe. In those instances where the explosive charge is positioned within the pipe, the explosive charge can be positioned either adjacent to or remote from the internal surface of the pipe.

Referring now to FIG. 13, there is disclosed another embodiment utilizing a shaped explosive charge or chamber in practicing the principles of this invention. Two pipes 96, 98 positioned in butt relationship and aligned relative to each other are retained in position by a holding means. A support means or anvil 102 having a diameter slightly smaller than the inside diameter of the pipes is positioned to prevent collapse of the pipe walls or a reduction of the inside diameter of the pipe during the detonation of the explosive. A rigid means 104 enables the support means 102 to be positioned within the pipe. In operation, the contacting end of the pipes are heated to a desired temperature by a heating means 106 the heated area in the ends of the pipes being represented by the numeral 100. Upon the ends of the pipes reaching the desired temperature, the heating means 106 can be repositioned to permit the explosive charge 108 and its support means 110 to be positioned over the heated ends of the pipes. Detonation of the explosive charge 108, illustrated in the figures as being in two parts produces a dual explosion, the pressure wave from the explosive charges having components which urge the workpieces towards each other. In this application, the explosive charge is used not only to form the weld, but to also urge the two workpieces towards each other during the making of the weld.

In disclosing the principles of this invention, reference was made to the joining together of workpieces which can be in the form of pipes, plates, or even the opposite edges of one plate to each other. In each instance where the welding of pipes is mentioned, it is to be understood that the welding of plates can also be accomplished. Additionally, while reference was made to the placing of the explosive charge on the outside surface, it is to be understood that the explosive charge can be placed on the inside surface of pipes and, if desired, two explosives, one placed on each side of the area to be welded can also be used, the explosives being detonated at the same instant. In this last mentioned procedure the explained forces counteract each other and the need for anvils is eliminated.

Continuing, when welding one member to another as, for example, when bonding cladding onto a plate, the clad is initially displaced slightly from the plate, the spacing commonly being referred to as a standoff or interface. Referring to FIG. 14 there is illustrated a constant interface or standoff of the clad from the base plate. The material to be clad 112 is displaced from and positioned parallel to a base plate 114 to which it is to be welded by a distance 116 which is constant. The explosive 118 is positioned above the clad 112, the detonator 120 being positioned at one end 122 of the explosive. This geometry is normally used in conjunction with low and medium velocity explosives and typical applications including lap and scarf welds.

Referring to FIG. 15 there is illustrated on angled interface displacement of the clad from the base plate. The material to be clad is angularly displaced from a base plate 126 to which it is to be welded at an angle 128. The explosive 130 is positioned above the clad 124, the detonator 132 being positioned at the end of the explosive adjacent to the point of contact between the clad 124 and the base 126. This geometry is normally used in conjunction with high velocity explosives and is used extensively to bond large areas as well as on small lap, seam and tie bands. When used on large areas, buffer materials such as Plexiglas, rubber or the like 134 are sometimes used.

Referring now to FIG. 14, the constant interface 116 can be maintained by positioning a flux such as borax or the like within the interface 16. The borax will maintain the desired separation of the workpieces 112, 114 from each other and, additionally, will help prevent the workpieces from being oxidized while the workpieces are being brought up to the desired temperature in preparation for the making of the actual weld. In operation, after the workpieces are heated to the desired temperature and the explosive charge is detonated, the hot workpieces 112, 114 are driven together squeezing out the flux spacer means which carries with it dirt and oxides. Thus, the flux functions as a spacer and an oxide-inhibiting means.

In a similar manner, a flux can be utilized when an angled interface is desired as illustrated in FIG. 15 by filling the space 136 with a flux, and the flux will function as a spacer and an oxide-inhibiting means.

Referring to FIG. 16, there is illustrated the explosive forming or shaping of metals utilizing the principles of this invention. A die 138 having a desired shape 140 supports a metal blank 142 above which is positioned an explosive charge 144. An insulating means such as a sheet of asbestos 146 or the like is interposed between the metal blank 142 and the explosive charge 144 to protect the charge from the heat of the blank. In operation, the metal blank 142 is heated to a desired temperature by oxyacetylene torches, oxypropane torches, induction heating, furnace heating or the like. Upon reaching the desired temperature, the metal blank is then positioned in the die 138, the explosive charge then being positioned above the blank 142 and protected from the heat of the block by means of the asbestos sheet 146 or the like. Detonation of the explosive charge forces the metal blank to assume the configurations of the die 138. The heating of the metal blank permits the explosive forming or shaping of metal with reduced force, reduced explosive charge and reduced noise and blast effects.

Obviously, many modifications and variations of the present invention are possible in the light of all of the above teachings. It is, therefore, to be understood that within the scope of the appended claims the invention may be practiced otherwise than as specifically described.

What I claim is:

1. The method of joining two workpieces by explosive bonding comprising heating said workpieces, and subjecting said workpieces to an explosive bonding force to weld together the heated workpieces.

2. The method of joining two workpieces by explosive bonding comprising holding the workpieces together edge to edge, heating the abutting edges of the workpieces, and subjecting said workpieces to an explosive bonding force to weld together the heated workpieces.

3. The method of claim 2 wherein said workpieces are held together edge to edge under pressure.

4. The method of joining together opposed ends of pipes comprising holding the pipes together end to end, heating the abutting ends of said pipes, and subjecting said pipes to an explosive bonding force to weld together the heated pipes.

5. The method of claim 4 wherein said pipes are held together under pressure.

6. The method of claim 4 wherein said explosive bonding force is applied around the outside of said pipes at the heated abutting ends.

7. The method of claim 6 including supporting the pipes internally to prevent their collapse when subjected to the explosive bonding force.

8. The method of claim 4 wherein said explosive bonding force is applied around the inside of said pipes at the heated abutting ends.

9. The method of claim 4 comprising positioning a filler piece around the abutting ends of the pipes prior to heating said abutting ends of the pipes.

10. The method of claim 1 including placing flux between said two workpieces.

11. The method of claim 4 comprising subjecting said pipes to an explosive bond force applied around both the outside and inside surfaces of said pipes at the heated abutting ends.

12. The method of claim 4 comprising subjecting said pipes to a directional explosive bonding force to weld together the heated pipes by a shaped charge.

13. The method of joining together two metal workpieces by explosive welding comprising heating portions of the workpieces to be joined to temperatures above room temperature but below their normal welding temperatures, subjecting said heated workpieces to an explosively generated welding force to weld together said heated portions of the workpieces.

14. The method of claim 13 and further including the step of placing a filler metal adjacent the two portions to be welded prior to subjecting said portions to the explosive force, the filler metal being positioned so that upon the application of the explosive force the filler metal becomes part of the weld joining the two portions.

15. The method of joining together two metal workpieces by explosive welding comprising placing a heating means adjacent the portions of the workpieces to be welded, heating the portions of the workpieces to be joined to temperatures above room temperature but below their normal welding temperatures, removing said heating means, placing an explosive means adjacent said heated portions of the workpieces to be joined, and subjecting said heated portions of the workpieces to an explosively generated welding force to weld together said heated portions of the workpiece.

References Cited

UNITED STATES PATENTS

| | | | |
|---|---|---|---|
| 3,163,141 | 12/1964 | Wesley et al. | 29—421X |
| 3,364,562 | 1/1968 | Armstrong | 29—421X |
| 3,409,969 | 12/1968 | Simons et al. | 29—421UX |
| 3,434,197 | 3/1969 | Davenport | 29—497.5X |
| 3,446,047 | 5/1969 | Cleland | 29—421X |
| 3,455,017 | 7/1969 | Zondag | 29—421X |

JOHN F. CAMPBELL, Primary Examiner

R. B. LAZARUS, Assistant Examiner

U.S. Cl. X.R.

29—486